US010169567B1

(12) United States Patent
Pentz et al.

(10) Patent No.: US 10,169,567 B1
(45) Date of Patent: Jan. 1, 2019

(54) BEHAVIORAL AUTHENTICATION OF UNIVERSAL SERIAL BUS (USB) DEVICES

(71) Applicant: Lockheed Martin Corporation, Bethesda, MD (US)

(72) Inventors: Andrew L. Pentz, Baltimore, MD (US); Chris K. Cockrum, Baltimore, MD (US); William W. Moldenhauer, Carrollton, TX (US); Robert Willson, Keller, TX (US); John W. Hebeler, Ellicott City, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/820,193

(22) Filed: Nov. 21, 2017

(51) Int. Cl.
*G06F 21/00* (2013.01)
*G06F 21/44* (2013.01)
*G06F 13/42* (2006.01)
*G06F 21/62* (2013.01)
*G06F 13/38* (2006.01)
*G06N 99/00* (2010.01)

(52) U.S. Cl.
CPC ............ *G06F 21/44* (2013.01); *G06F 13/385* (2013.01); *G06F 13/4282* (2013.01); *G06F 21/6218* (2013.01); *G06F 2213/0042* (2013.01); *G06N 99/005* (2013.01)

(58) Field of Classification Search
CPC .......... G06F 21/44; G06F 21/62; G06F 21/18; G06F 13/385; G06F 13/4282; G06F 2213/0042; G06N 99/005
See application file for complete search history.

(56) References Cited

U.S. PATENT DOCUMENTS 7,043,587 B2* 5/2006 Burke ................... G06F 9/4411
710/260
7,690,030 B1* 3/2010 Ma ...................... G06F 12/1416
713/172

(Continued)

OTHER PUBLICATIONS

Letaw et al., Host Identification via USB Fingerprinting. IEEE Xplore Digital Library. May 26, 2011. 9 pages.

(Continued)

*Primary Examiner* — Beemnet W Dada
(74) *Attorney, Agent, or Firm* — Wolf, Greenfield & Sacks, P.C.

(57) ABSTRACT

Systems and methods for performing behavioral authentication of Universal Serial Bus (USB) devices are described. These methods may capture one or more behavioral characteristics of a specific USB device and may generate a device fingerprint based on the captured characteristics. When the USB device is plugged in again in the host device, the behavioral characteristics of the USB device may be re-captured and may be compared to those of the device fingerprint. If it is determined that such behavioral characteristics substantially match, authorization may be granted. In one example, timing characteristics may be used as behavioral characteristics, in which the timing of a series of transactions is sensed by the host device. A timing characteristic may include, for example, the time it takes the USB device to complete a transaction. The transactions are part of an enumeration process in some embodiments.

18 Claims, 14 Drawing Sheets

(56) References Cited

U.S. PATENT DOCUMENTS

| | | | | |
|---|---|---|---|---|
| 8,209,462 B2* | 6/2012 | Cheng | ............... | G06F 3/0605 |
| | | | | 711/100 |
| 8,527,680 B2* | 9/2013 | Hatada | ............... | G06F 13/102 |
| | | | | 710/104 |
| 8,627,420 B2* | 1/2014 | Furlan | ............... | H04L 12/2809 |
| | | | | 726/5 |
| 8,713,683 B2* | 4/2014 | Moore | ............... | G06F 21/85 |
| | | | | 713/187 |
| 8,862,803 B2* | 10/2014 | Powers | ............... | G06F 13/385 |
| | | | | 710/306 |
| 9,081,911 B2* | 7/2015 | Powers | ............... | G06F 13/4072 |
| 9,081,946 B2* | 7/2015 | Fruhauf | ............... | G06F 21/80 |
| 9,940,487 B2* | 4/2018 | Soffer | ............... | H01R 4/4809 |

OTHER PUBLICATIONS

Pruse, Automating USB-Based Host Fingerprinting with Embedded Devices. Presented to the Department of Computer and Information Science at the University of Oregon. Jun. 2013;33 pages.

* cited by examiner

| Device | VID | PID | Manufacturer | Product |
|---|---|---|---|---|
| USB Flash Drive 1 | 34138 | 4096 | JetFlash | Mass Storage Device |
| USB Flash Drive 2 | 1921 | 21510 | SanDisk | U3 Cruzer Micro |
| USB Flash Drive 3 | 5118 | 20992 | N/A | Patriot Memory |

FIG. 5A

| Device | VID | PID | Manufacturer | Product |
|---|---|---|---|---|
| Keyboard 1 | 1035 | 8192 | Generic | USB Keyboard |
| Keyboard 2 | 16700 | 8449 | Dell | Smart Card Reader Keyboard |

FIG. 6A

BEHAVIORAL AUTHENTICATION OF UNIVERSAL SERIAL BUS (USB) DEVICES

BACKGROUND

Universal Serial Bus (USB) is an industry standard that defines cables, connectors and communication protocols for connection, communication, and power supply between host devices (typically computers or servers) and external peripherals. Over the last few decades, USB has largely replaced a variety of previous interfaces, including serial and parallel ports. Presently, a wide variety of peripherals include USB interfaces for enabling communication with computers. Examples of such peripherals include printers, keyboards, mass storage device, scanners, cameras and mice.

USB interfaces are configured to enable exchange of data in a bi-directional manner. That is, data can be transferred from the host device to the USB device and vice versa. The original USB 1.0 interface enabled data rates up to 1.5 Mbit/s in low speed mode, and 12 Mbit/s in full speed mode. More recent versions, such as USB 3.2, allow data rates of up to 20 Gbit/s. In addition, USB interfaces are configured to provide power to the devices being connected to the host device. In this way, no additional cables are needed for powering.

Most peripherals, including printers, scanners and cameras, include intelligent electronic circuits. Such circuits are often programmed with internally stored firmware designed to control the device's operations. By contrast, some low-cost peripherals are not programmed with firmware, but rather rely on the host device to provide the control program.

In recent years, the number of software attacks aimed at maliciously accessing private information in computer systems has grown dramatically. One popular way for carrying out software attacks is via USB devices. In social engineering attacks, malicious actors use USB keys that contain HTML files to phish the user for their login and password information once the user clicks on the files. On the other hand, human interface device (HID) spoofing use specialized hardware to fool a computer into believing that a malicious USB key is a keyboard. The fake keyboard injects fake keystrokes designed to compromise the victim's computer. HID spoofing is the most commonly used type of attack via USB. Finally, in zero-days attacks, malicious keys use custom hardware that exploits a vulnerability in a USB driver to get direct control of a computer as soon as it is plugged in.

BRIEF SUMMARY

One aspect of the present disclosure is directed to a method for authenticating a universal serial bus (USB) device is provided. The method may comprise receiving the USB device with a USB interface of a host device; sensing a plurality of behavioral characteristics of the USB device; comparing the plurality of behavioral characteristic of the USB device with data associated with the USB device, the data associated with the USB device being stored in a non-volatile memory of the host device, to obtain a value indicative of a degree of similarity between the plurality of behavioral characteristic of the USB device and the data associated with the USB device; and determining whether the USB device is an authorized device based on the value indicative of the degree of similarity between the plurality of behavioral characteristics of the USB device and the data associated with the USB device.

Another aspect of the present disclosure is directed to at least one non-transitory computer readable medium encoded with instructions that, when executed by at least one processor of a computer system, perform a method for authenticating a universal serial bus (USB) device, the method comprising: upon reception of the USB device in a USB interface of a host computer, sensing a plurality of behavioral characteristics of the USB device; comparing the plurality of behavioral characteristic of the USB device with data associated with the USB device, the data associated with the USB device being stored in a non-volatile memory of the host device to obtain a value indicative of a degree of similarity between the plurality of behavioral characteristic of the USB device and the data associated with the USB device; and determining whether the USB device is an authorized device based on the value indicative of the degree of similarity between the plurality of behavioral characteristic of the USB device and the data associated with the USB device.

Another aspect of the present disclosure is directed to a method for creating a fingerprint of a universal serial bus (USB) device, the method comprising: receiving the USB device with a USB interface of a host device, wherein the USB device is deemed safe by a user; initiating a transaction between the host device and the USB device at least in part by sending a plurality of requests to the USB device; receiving, from the USB device, a plurality of responses to the plurality of requests; for at least a subset of the plurality of responses, sensing a plurality of behavioral characteristics associated to corresponding responses of the subset of the plurality of responses; and storing the plurality of behavioral characteristics in a non-volatile memory of the host device.

Another aspect of the present disclosure is directed to at least one non-transitory computer readable medium encoded with instructions that, when executed by at least one processor of a computer system, perform a method for creating a fingerprint of a universal serial bus (USB) device, the method comprising: receiving the USB device with a USB interface of a host device, wherein the USB device is deemed safe by a user; initiating a transaction between the host device and the USB device at least in part by sending a plurality of requests to the USB device; receiving, from the USB device, a plurality of responses to the plurality of requests; for at least a subset of the plurality of responses, sensing a plurality of behavioral characteristics associated to corresponding responses of the subset of the plurality of responses; and storing the plurality of behavioral characteristics in a non-volatile memory of the host device.

Another aspect of the present disclosure is directed to a system for authenticating a universal serial bus (USB) device, the system comprising: a behavioral database comprising behavioral data associated to a plurality of USB devices; a fingerprint detector coupled to a USB interface of a host device, the fingerprint detector being configured to: sense, upon reception of a USB device with the USB interface, a plurality of behavioral characteristics of the USB device; compare the plurality of behavioral characteristic of the USB device with the behavioral data associated to a plurality of USB devices stored in the behavioral database to obtain a value indicative of a degree of similarity between the plurality of behavioral characteristic of the USB device and the behavioral data associated with at least one of the plurality USB devices; and determine whether the USB device is an authorized device based on the value indicative of the degree of similarity between the plurality of behavioral characteristic of the USB device and the data associated with at least one of the plurality USB devices.

BRIEF DESCRIPTION OF DRAWINGS

Various aspects and embodiments of the application will be described with reference to the following figures. It should be appreciated that the figures are not necessarily drawn to scale. For purposes of clarity, not every component may be labeled in every drawing.

FIG. 5A is a table including a list of USB flash drives that were characterized with behavioral authentication techniques of the types described herein, in accordance with some embodiments.

FIG. 6A is a table including a list of keyboards that were characterized with behavioral authentication techniques of the types described herein, in accordance with some embodiments.

DETAILED DESCRIPTION

I. Overview

Figure 1:
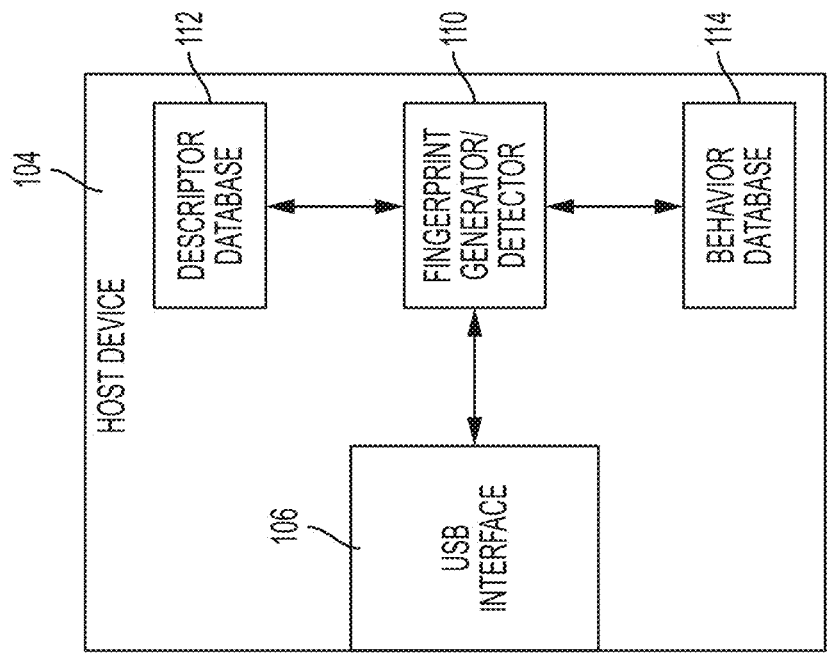
FIG. 1 is a block diagram illustrating an example of a system for behavioral authentication, in accordance with some embodiments.
Figure 1:
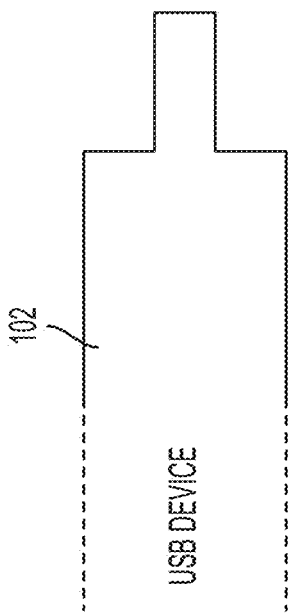

The inventors have recognized and appreciated that the vulnerability of universal serial bus (USB) devices (i.e., devices configured to be connected to host devices via USB interfaces) to software attacks may be improved by performing behavioral authentication whereby a device fingerprint is created based on intrinsic behavioral characteristics of the USB device. In behavioral authentication, authorization is granted only when the behavioral characteristics of a USB device matches the expected behavior. The inventors have appreciated that, compared to conventional identification techniques, USB devices that undergo behavioral authentication as an enhancement to conventional techniques are significantly less likely to be the subject of a software attack.

USB devices are vulnerable to a variety of software attack vectors. For example, a device with the hardware of a USB flash drive can easily be reprogrammed to emulate a device having a USB interface for connecting to a host device. When a device is spoofed in this manner, privilege escalation may be accomplished on a target system, in which the spoofing device can acquire privileges that would otherwise be denied. Once the target system has been breached, attack possibilities are nearly endless. Recent research has demonstrated that software attacks can be propagated from device to device in a virus-like fashion. As a result, this poses a threat not only to the target system, but also to a host of other systems in communication with the target system. Even the most innocuous devices, such as keyboards, mice and printers, can be abused if they are leveraged by malicious actors. From a functional standpoint, such hostile actions can appear the same as valid actions performed by legitimate users, thus making software attacks difficult to spot.

Conventionally, identification of USB devices is performed by retrieving the device's identity. That is, when a USB device is plugged into a computer, a process is initiated in which the USB device provides, among other parameters, a serial number, a product ID and a manufacturer ID. In some circumstances, authorization is then provided if these identifiers are found in a list, kept by the computer, of known identifiers that are deemed safe. In other circumstances, however, the identifiers of the device are not compared against a list of safe identifiers, and is granted access as is. In yet other circumstances, authorization is denied if these identifiers are found in a list, kept by the computer, of known identifiers that are deemed to be unsafe. The inventors have recognized that attacks to USB devices authorized based on conventional methods can be carried out by spoofing these values, whereby a malicious device pretends to be a previously identified and authorized device. Some systems are designed to reduce the risk of attacks by increasing the number of identifiers requested from a USB device. The inventors have recognized, however, that even large sets of identifiers are prone to spoofing. Additionally, while some more recent versions of the protocol provide means for unilateral authentication of devices, these systems can be easily breached by attackers using previous versions of the protocol which do not support any procedure for authentication.

Some embodiments of the present disclosure are directed to techniques for performing authentication by identifying anomalies in the behavior of a device that are inconsistent with the expected behavior. The inventors have appreciated that behavioral characteristics are specific to individual devices, and as such are not easily spoofed.

Different behavioral characteristics may be used. In some embodiments, behavioral authentication is performed by characterizing the timing of events occurring during a communication session, and only considering a device to be authenticated if its timing characteristics are a close match of the expected values. Some embodiments are directed to methods for recognizing the timing of certain operations occurring in connection with USB devices, such as operations that are critical to the execution of the USB protocol or specific to certain types of devices.

Some methods described herein are designed to generate a device fingerprint by aggregating various timing characteristics associated with certain device operations, and to record the aggregated characteristics for future authentication. In some embodiments, a white listing approach may be used in connection with the behavioral authentication techniques described herein. That is, a whitelist including timing fingerprints of devices that are allowed to operate on the system may be maintained, where each timing fingerprint includes multiple timing characteristics.

When a USB device is first inserted into a host device, if the USB device is deemed safe by the user (e.g., it is a brand new device or has otherwise not been exposed to potential USB malware or tampering), the host device may give the user the option to create and add the device fingerprint to the whitelist. The device fingerprint may be constructed by aggregating multiple timing characteristics of the device. Subsequently, when the device is inserted again, the device fingerprint may be re-captured and may be compared with the data stored in the whitelist. If this fingerprint substantially matches the fingerprint stored in the whitelist (e.g., within an acceptable range), then the device may be authorized. Contrarily, if the timing characteristics do not match the fingerprint stored in the whitelist, authorization may be denied. In addition, at least in some embodiments, the host device may output an alert notification informing the user or the system administrator that the USB device should not be trusted and/or that a potential threat is underway.

USB devices whose timing characteristics have been recorded are allowed to be taken into the "wild" (e.g., outside an office, house, building, campus, city, country, etc.) and then brought back. If any malicious modifications are made to the device's firmware while into the wild, for example through a so-called "BadUSB" malware or other means, these changes may lead to variations in the behavior of the USB device, which may be detected using the techniques described herein.

Examples of timing characteristics include, but are not limited to, the duration of a specific event, the delay with which an event occurs relative to a preceding event, and the frequency of a set of specific events. In some embodiments, timing characteristics may be sensed during an enumeration process (the process in which a newly inserted device is configured for its normal operations). An enumeration process involves a set of requests (and optionally other types of signals used for establishing proper operations of the USB device) that are provided to the USB device upon being plugged into the host USB interface. Once these requests are received, the USB device may handle the requests using its internal circuitry (e.g., a microcontroller, a processor, a field gate programmable array, etc.). The architecture used in the internal circuitry typically varies from USB device to USB device. Different architectures employ different internal clock frequencies, instruction sets, and firmware implementations. Due to the different architectures, there may be a large degree of variability, from USB device to USB device, in the timing associated with the responses to the requests and/or in the time associated with other enumerations signals.

In one example, a USB device fingerprint may be constructed by aggregating the timing characteristics of an enumeration process (or at least a subset of the timing characteristics of an enumeration process). In another example, the timing of specific operations associated with certain classes of devices may be sensed and recorded, and used for authentication. One of these classes of devices is mass storage devices, which are used to store information in a non-volatile fashion. Among other possible timing characteristics, the timing associated with write and/or read operations may be used for behavioral authentication. Depending on the hardware and firmware used in the mass storage device, write and read operations may involve different sequences of instructions and may have different timing. In some embodiments, information indicative of the timing with which these sequences of instructions are performed may be aggregated to construct the device fingerprint. Take for example a hard disk that takes 30 ms to complete a read operation. If this device is plugged in again, and the host device determines that a read operation only takes 2 ms, it may be determined that the device has been spoofed.

In yet another example, the timing of the sequence generated in response to a mouse click or motion may be used as a behavioral characteristic. When a mouse button is clicked, the hardware and firmware internal to the mouse generate a set of signals intended to cause the host computer to perform a certain operation, such as opening a window or selecting an item from a drop-down menu. The timing with which these signals are generated and transmitted may depend on the specific hardware and firmware used in the mouse, and may be used to construct a fingerprint for the mouse. Similarly, a fingerprint for a keyboard may be constructed by sensing and recording the timing of the signals generated in response to a keystroke.

It should be appreciated that not all embodiments are limited to the use of timing characteristics to perform behavioral authentication, as other behavioral characteristics may be used. For example, some embodiments are directed to authentication of USB devices based on their impedance or other electrical characteristics. Accordingly, a set of measurements of impedance (or other electrical characteristics) may be taken when a USB is first plugged into a host device, and the results of these measurements may be aggregated to form a device fingerprint. Subsequently, when the device is plugged again in the host device, another set of measurements is taken, and if the result of these measurements substantially matches (e.g., within an acceptable range) that of the fingerprint, authorization is granted. In another example, the power characteristics of a USB device may be used as behavioral characteristics. For example, the host device may sense the power or the current absorbed by a USB device when performing a certain operation, and may construct a fingerprint based on aggregated power information. More generally, any behavioral characteristic that a USB device exhibits during its operations may be used according to the authentication techniques described herein.

The inventors have appreciated that authentication based on behavioral characteristics (e.g., timing or other types of characteristics) may significantly mitigate the risks of software attacks carried out through USB interfaces, thus increasing the usability, robustness and durability of the USB protocol itself.

While some embodiments are described in connection with the USB protocol, it should be appreciated that not all embodiments are limited in this respect. For example, in other embodiments, authentication of the devices connected via different interfaces may be performed using the techniques described herein. Non-limiting examples of such alternative interfaces include FireWire, Ethernet, MIDI, SATA, Thunderbolt, GPIB, RS-232, Fibre Channel, PCI Express, MIL-STD-1553 (or other master-slave protocols), and any other suitable wired or wireless protocol.

II. Systems and Methods for Behavioral Authentication

FIG. 1 depicts an illustrative system for behavioral authentication, in accordance with some embodiments. USB device 102 represents any of numerous devices that may be interfaced with a host device through a USB interface. Non-limiting examples of USB devices include mice, keyboards, printers, flash drives, mass storage devices, Ethernet-over-USB devices, audio devices such as microphones, headphones and speakers, smartphones, tablets, scanners, webcams, microphones, cameras, joysticks, joypads, MP3 players, and many more. The USB device 102 may include a USB connector adapted to be inserted into a complementary receiving port. The USB device 102 may include electronic hardware, such as a processor, a microcontroller, a field programmable gate array (FPGA), and/or an application specific integrated circuit (ASIC), programmed to enable exchange of data with the host device.

Host device 104 may be arranged to receive USB device 102. Host device 104 may include a desktop computer, a laptop, a server, a mainframe, a smartphone, a tablet, or other types of computers. Host device 104 includes USB interface 106, which includes a USB port adapted to receive a USB device. The USB interface 106 includes a combination of hardware and software capabilities configured to carry out transactions with USB devices. The USB interface may adopt any suitable USB protocol, such as USB 1.0, USB 2.0, USB 3.0, USB 3.1, USB 3.2, or other versions. USB interface 106 may include multiple USB ports for receiving, simultaneously or at different times, multiple USB devices.

Host device 104 includes fingerprint generator/detector 110, which is in communication with USB interface 106 and may be implemented in any of numerous ways. In one example, fingerprint generator/detector 110 is embedded as part of the USB controller used for USB interface 106. In another example, fingerprint generator/detector 110 includes a dedicated chip, such as a processor, a microcontroller, a field programmable gate array (FPGA), and/or an application specific integrated circuit (ASIC). In yet another example, fingerprint generator/detector 110 is part of the host device operating system kernel and may be programmed using Linux, Windows, Unix, Mac OS, or other operating systems.

Fingerprint generator/detector 110 may be in communication with descriptor database 112 and behavior database 114. While the descriptor database and the behavior database are shown as being separate databases, in some embodiments they may aggregated into a single database. Descriptor database 112 and behavior database 114 may be created in separate non-volatile memory units or in a common non-volatile memory unit. In some embodiments, the content of the databases may be encrypted, for example using a hash function. Descriptor database 112 may include lists of descriptor data for different USB devices. Descriptor data may include data that exchanged with a USB device during an enumeration process (the process in which a newly inserted device is configured for its normal operations). Examples of descriptor data include, but are not limited to, serial numbers, product IDs and manufacturer IDs. When an enumeration is performed, the host device 104 may send one or more requests to obtain descriptor data from the USB device, where each requests includes multiple transactions (packet transmissions). In some embodiments, if the USB device has not been previously connected to host device 103, the descriptor data (or at least a portion of the data) may be stored in the descriptor database 112.

Behavior database 114 may include a list of behavioral characteristics that have been received from USB devices previously connected to the host device 104. In one example, the behavioral characteristics include timing characteristics. In another example, the behavioral characteristics include impedance characteristics. In yet another example, the behavioral characteristics include power characteristics.

Figure 2:
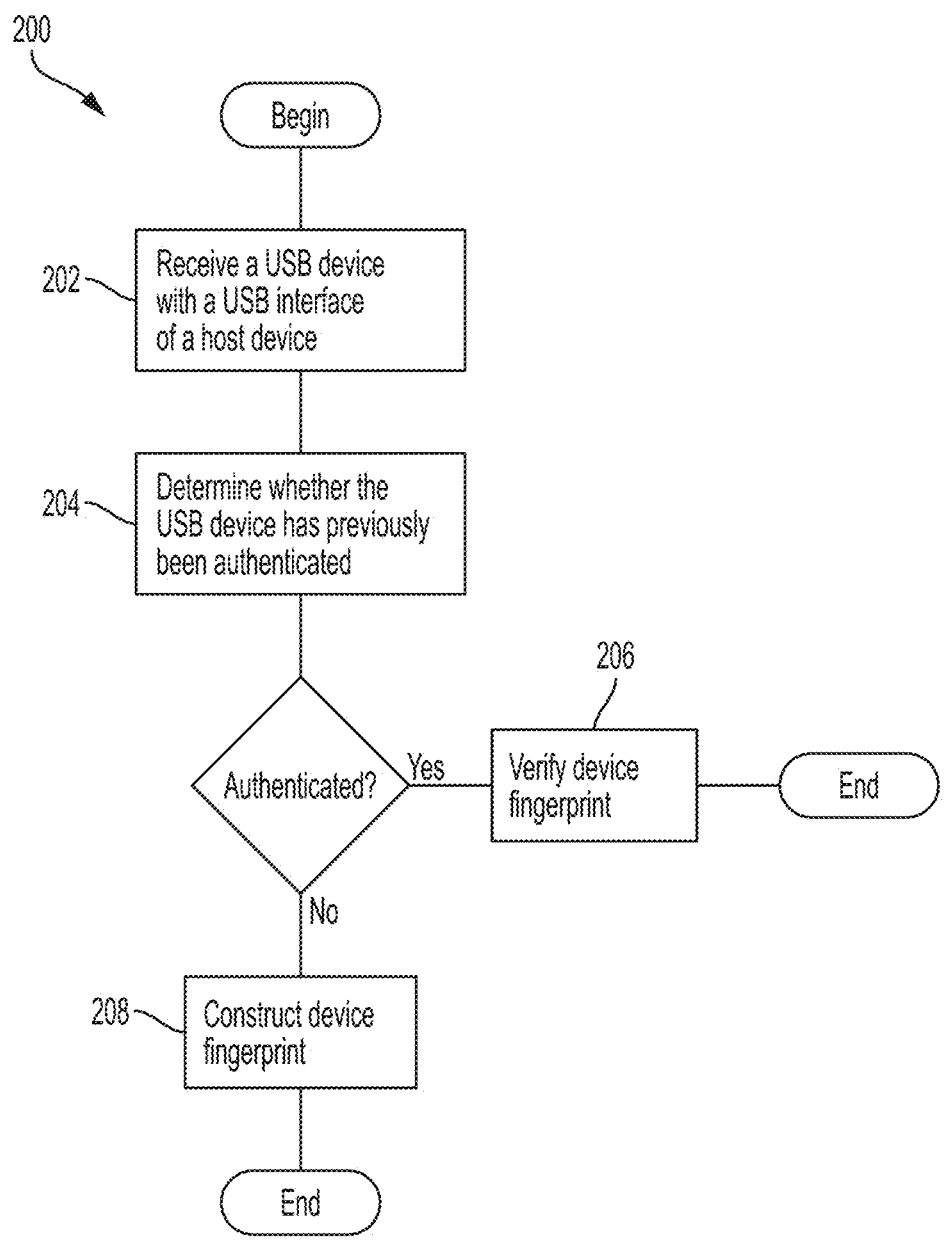
FIG. 2 is a flowchart illustrating an example of a process for performing behavioral authentication, in accordance with some embodiments.

Fingerprint generator/detector 110 may be encoded with instructions that, when executed, may perform a behavioral authentication routine. An illustrative behavioral authentication routine is depicted in FIG. 2, in accordance with some embodiments. As illustrated, routine 200 begins at act 202, in which a USB device (such as USB device 102) is received in USB interface 106. At act 204, host device 104 may determine whether the received USB device has already been authenticated. For example, in some embodiments, host device 104 may initiate an enumeration process and may send one or more requests to provide identity information. If it is determined that the USB device has already been authenticated (for example, if it is determined that the device's descriptor data are already present in the descriptor database 112), routine 200 may proceed to act 206, in which the device fingerprint is verified based on behavioral characteristics of the USB device. If it is determined that the device has not been previously authenticated, routine 200 may proceed to act 208, in which a new fingerprint may be generated based on behavioral characteristics of the USB device. It should be appreciated that, in some embodiments, generation of the fingerprint may be initiated when approval from the user is received. Accordingly, in some embodiments, host device 104 may solicit the user to specify whether the USB device can be considered safe. Once the user has confirmed that the USB device is safe, for example because the USB device is brand new or because the user is certain that the device has never been used by anyone else, generation of a new fingerprint may be performed.

It should be appreciated that, in some embodiments, verification of the device fingerprint may be performed absent a determination of whether the USB device has previously been authenticated. For example, when a USB device is received at act 202, routine 200 may directly proceed to act 206. In some such embodiments, if fingerprint verification fails, routine 200 may then proceed to act 208.

Figure 3:
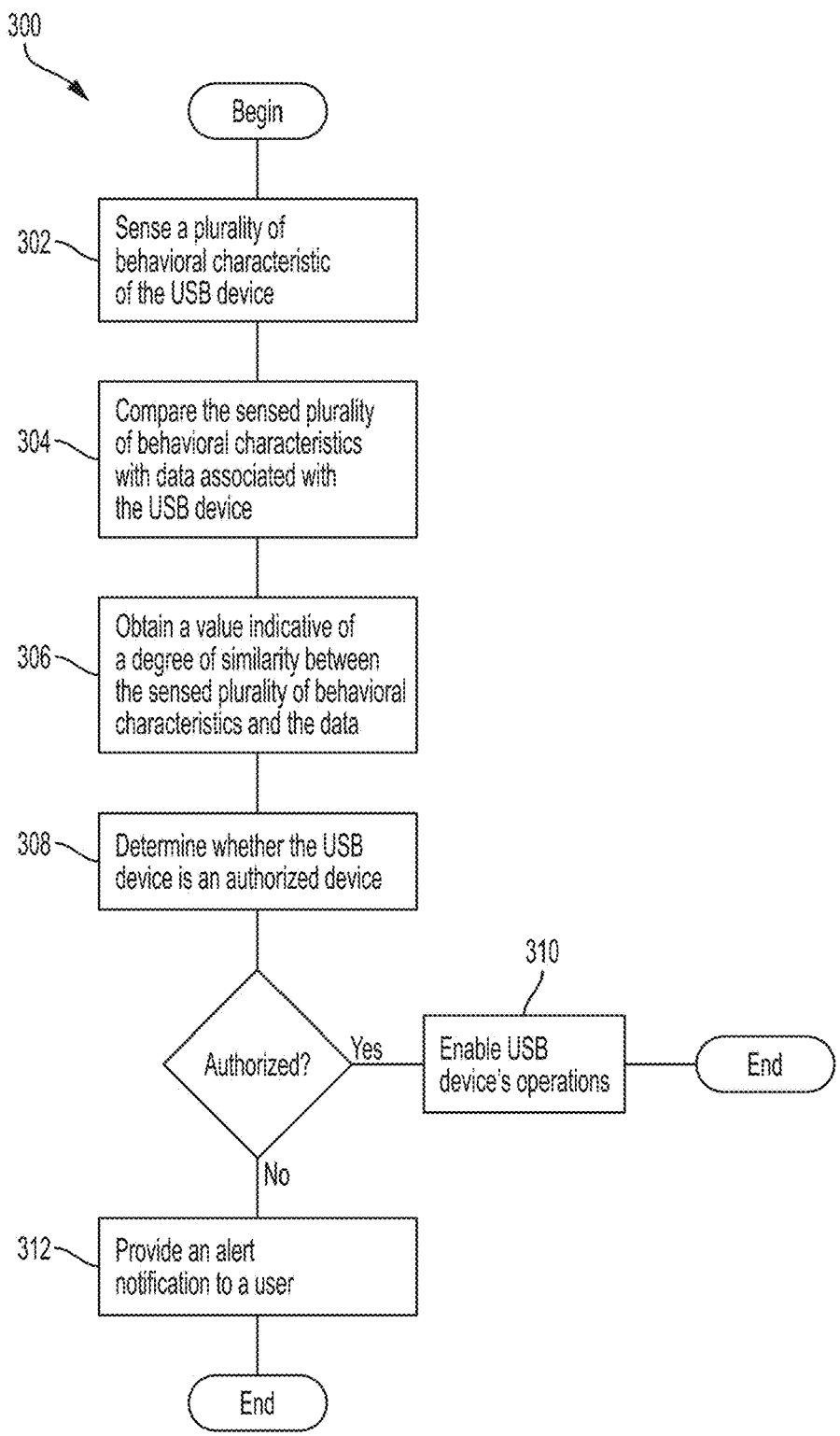
FIG. 3 is a flowchart illustrating an example of a process for verifying a device fingerprint, in accordance with some embodiments.

One illustrative example of a routine for verifying the fingerprint of a USB device is depicted in FIG. 3, in accordance with some embodiments. Routine 300 may be executed by fingerprint generator/detector 110. Routine 300 may begin at act 302, in which a plurality of behavioral characteristics of the USB device are sensed. In some embodiments, sensing of a behavioral characteristic may include measuring a characteristic of one or more signals sent to the host by the USB device (where a signal may be sent in response to a request or may be unsolicited). For example, in at least some of the embodiments in which the behavioral characteristics include timing characteristics, sensing of such characteristics may include measuring the timing of a corresponding signal. Time measurements may be performed in any suitable fashion, including for example using a timer or a counter controlled by a clock signal. Time measurements may include measurements of the duration of an event, measurements of the frequency of a set of events, measurement of the delay of an event with respect to a previous event, and/or other types of measurements. In some embodiments, sensing a characteristic may include counting the number of events that occurred as part of a particular operation, such as the steps involved in an enumeration process, a read/write operation, a mouse click, a keystroke, etc.

Routine 300 may then proceed to act 304, in which the sensed characteristics are compared with data stored in the behavioral database 114. In some embodiments, act 304 may be performed by searching the database to identify data substantially matching (e.g., within an acceptable range) the sensed behavioral characteristics. If no data is found that substantially matches the sensed behavioral characteristics, it may be determined that the USB device is either unknown or unsafe.

In other embodiments, behavioral database 114 may be indexed based on descriptor data contained in descriptor database 112. That is, data may be organized such that descriptor data for a USB device point to behavioral characteristic data for the same USB device. In some such embodiments, the host device may first search for the descriptor data received in the enumeration process within the descriptor database 112. If such data are found, host device 104 may access the corresponding indexed record(s) in the behavioral database 114.

Comparison of the sensed behavioral characteristics with the stored behavioral data may be performed in any suitable way. The result of the comparison may be obtained at act 306, and may provide an indication of the degree to which the sensed behavioral characteristics are similar to the stored behavioral data. In some embodiments, the comparison may involve statistical analyses, geometric methods, machine learning techniques, or any suitable combination thereof, or any other method for performing a numerical comparison. In one example, the comparison is accomplished by computing a correlation between the sensed behavioral characteristic and the stored behavioral data. The correlation may be performed numerically, for example using fingerprint generator/detector 110. The result of the correlation may be indicative of the degree of similarity between the sensed behavioral characteristic and the stored behavioral data. In another example, Euclidean distance calculations may be performed to determine the degree of similarity. In another example, a comparison of a measurement may be performed against a Gaussian distribution representing the probability density that a certain type of behavior is a match. Specifically, if the measurement falls within a predefined range of the Gaussian distribution that is deemed safe (e.g., within one, two, or three standard deviations), authorization may be granted. In another example, neural network techniques may be used to determine the degree of similarity, such as artificial and/or convolutional neural networks to recognize relationships within a data set, and/or recurrent neural networks to recognize relationships over time between data sets. In some embodiments, neural networks may be evaluated to classify the behavior of the device using a trained model as part of the fingerprint verification. In one specific example, the classification may include labeling trusted devices as such and labeling malicious devices as such. In another example, the devices may be classified based on their type (e.g., mass storage, mouse, keyboard, etc.), manufacturer, model, serial number and/or according to other methods classification. In yet another example, random forest categorization models may be used.

At act 308, fingerprint generator/detector 110 may determine whether the USB device is an authorized device based on the result obtained from the comparison. In some embodiments, the result of the comparison (e.g., the correlation) may be compared to a predefined threshold to determine whether the sensed behavioral characteristic and the stored behavioral data are sufficiently similar to grant an authorization. Alternative methods for determining whether the sensed behavioral characteristics and the stored behavioral data are sufficiently similar may be used. These methods are not necessarily limited to the use of thresholds as described above.

If fingerprint generator/detector 110 determines that the USB device is an authorized device (e.g., based on whether the sensed behavioral characteristic and the stored behavioral data are sufficiently similar), operations of the USB device may be enabled at act 310. By contrast, if fingerprint generator/detector 110 determines that the USB device is not an authorized device, operations of the USB device may not be permitted. In some embodiments, upon determining that the USB device is not authorized, an alert notification may be sent to the user and/or to a system administrator (act 312). The alert notification may indicate that the USB device is unknown and should not be trusted.

Figure 4:
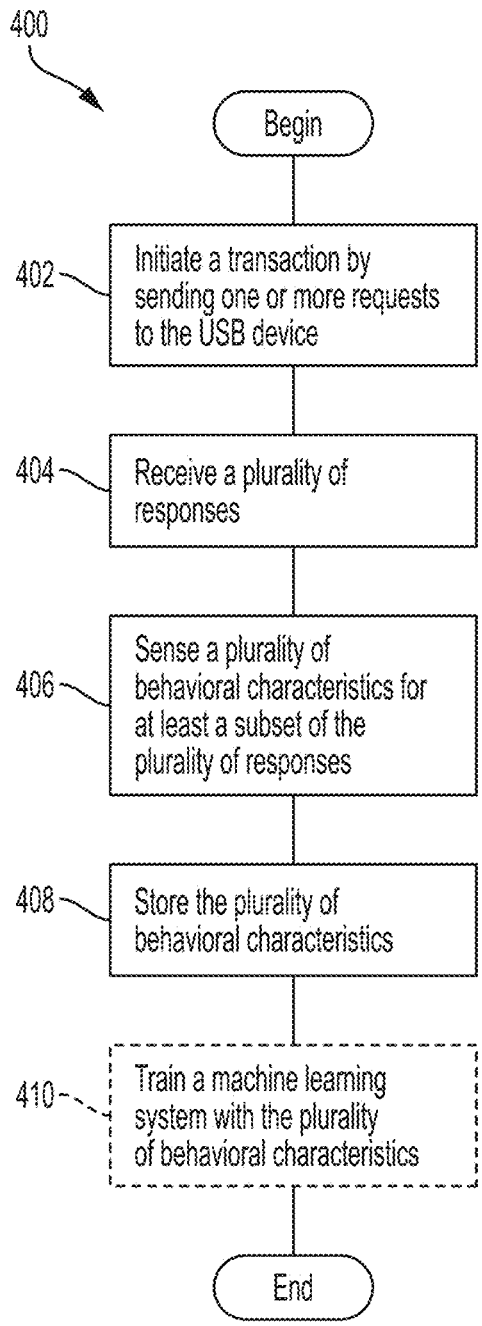
FIG. 4 is a flowchart illustrating an example of a process for constructing a device fingerprint, in accordance with some embodiments.

As described in connection with FIG. 2, if the USB device is unknown to the host device or simply no authentication has previously been performed, a new behavioral fingerprint may be generated for the USB device. An illustrative routine for generating a behavioral fingerprint is depicted in FIG. 4, in accordance with some embodiments. Routine 400 may be executed by fingerprint generator/detector 110. Routine 400 may begin at act 402, in which host device 104 initiates a request with the USB device by sending one or more transactions or other types of data sequences to the USB device. In one example, the request may initiate an enumeration process. Responsive to the request, the USB device may perform one or more operations. In some embodiments, the USB device may access information (e.g., descriptor data) from an internal memory and may provide one or more responses communicating the accessed information to the host device and/or the status of the operation. At act 404, the host device may receive the response(s) from the USB device. Of course, the enumeration process is only one example of a request, as other types of sequences of data may be forwarded at act 402 and used for constructing a fingerprint. One example of such a sequence is a "speed negotiation", in which a host device and USB device negotiate the speed at which future communications will take place.

At act 406, one or more behavioral characteristics of the USB device may be sensed based on the response(s) received at act 404. Sensing of the behavioral characteristics may be performed as described in connection with act 302 (see FIG. 3).

At act 408, the sensed behavioral characteristics may be stored in the behavioral database 114. Data may be organized such that fields in the behavioral database 114 are indexed by fields in the descriptor database 112, though not all embodiments are limited in this manner.

Optionally, at act 410, a machine learning system may be trained based on the sensed behavioral characteristics. In one example, behavioral characteristics of a specific device may be sensed numerous times throughout numerous measurements. The measurements obtained may be fed into the machine learning system, which may be configured to extract recurrent patterns. In this way, variability in the behavioral characteristics of the specific device may be filtered. Variability of the behavioral characteristics may be caused, among other factors, by the conditions (e.g., the temperature) in which a measurement is performed and/or by noise. When machine learning techniques are used, act 304 (FIG. 3) may be performed by comparing the sensed behavioral characteristics with the data trained at act 410.

In some embodiments, machine learning techniques may be used to output the predefined threshold used in some embodiments at act 308.

III. Examples of Behavioral Characteristics

In some embodiments, timing characteristics may be used as a particular class of behavioral characteristics, though not all embodiments are limited in this respect. In some embodiments, the USB interface periodically interrogates the USB device to determine whether there are pending actions that require attention from the host device. If it is determined that there is a pending action that requires attention by the host processor, the USB interface may send an interrupt to the host device's processor. In some embodiments, the expression "polling" is used to indicate the periodic interrogation. The interrogation may be performed at a fixed rate (the polling rate), though not all embodiments are limited to fixed rates.

Fingerprints may be formed using the timing characteristics of specific transactions, of specific requests (which include set of transaction), or based on the time characteristics of other types of communication sequence that may be exchanged between the host and the USB device, and representations thereof.

The table shown in FIG. 5A lists a number of devices that were characterized according to the behavioral authorization techniques described herein. In particular, three USB flash drives were characterized. The column labelled "VID" indicates vendor ID and the column labelled "PID" indicates product ID. The additional columns show the manufacturer of the USB flash drive and the type of product in which the USB flash drive is utilized.

Figure 5C:
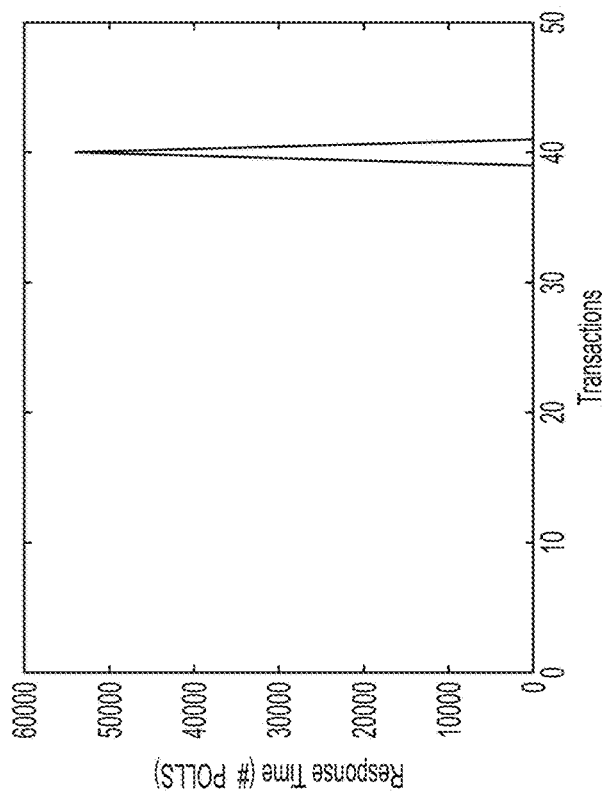
FIGS. 5B-5G are examples illustrating timing characteristics of responses provided by the USB flash drives of the table of FIG. 5A, in accordance with some embodiments.
Figure 5B:
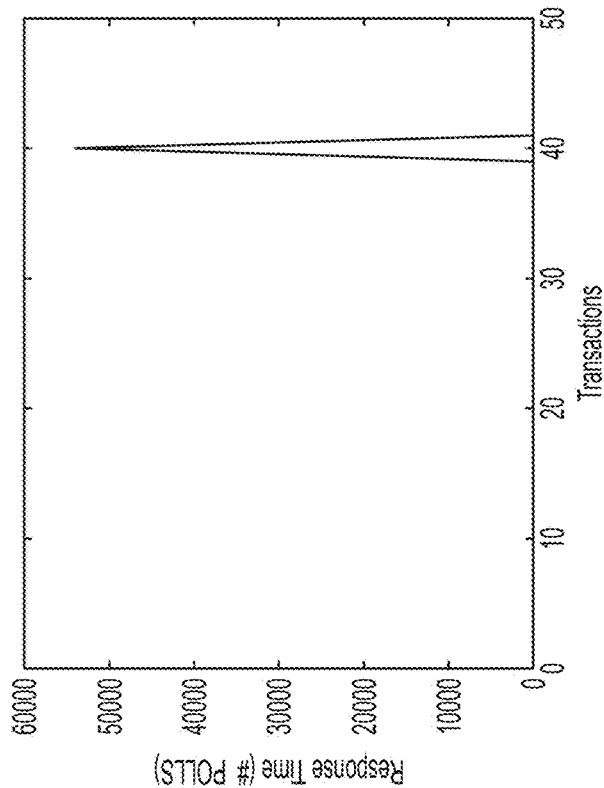

FIGS. 5B-5C illustrate examples of characterizations that were carried out using the devices listed in the table. In particular, FIGS. 5B-5C are graphs plotting the number of polls required to perform a particular transaction (e.g., to send a response from the USB device to the host device) versus the total transactions that are part of a particular process (such as an enumeration process or the process in which a read operation is performed). In this context, polls may indicate occurrences of specific events (e.g., transmission of specific data) or merely signals indicating that the device is ready to take an action. In some embodiments, a transaction may represent the transmission of a packet, which may include a token block, a payload block, and an acknowledgment block. The token block may include information indicative of the type of data contained in the packet. The payload block may include the actual data. The acknowledgment block may include bits for confirming whether the packet transmission has been executed successfully.

In essence, FIGS. 5B-5C illustrate the time it takes the USB device to complete each transaction of a process. It should be appreciated that other ways of evaluating the timing of the transactions of a process other than the polls may be used. FIG. 5B illustrate the response of the USB flash drive 1 during a first measurement and may be used as a fingerprint for future transactions with USB flash drive 1. FIG. 5C illustrates the response of the USB flash drive 1 during a second measurement, for example when authentication is performed as described in FIG. 3 (act 302). As shown, FIG. 5B exhibits a single pulse in correspondence to transaction #40, which takes between fifty thousand and sixty thousand poll intervals to complete. FIG. 5C exhibits a similar timing characteristic. That is, FIG. 5C exhibits a single pulse in correspondence to transaction #40, which takes between fifty thousand and sixty thousand poll intervals to complete. The timing characteristics of the responses of FIGS. 5B and 5C may be compared, for example using a correlation, to determine the degree to similarity. A determination of whether authorization should be granted or not may be performed based on the result of the comparison (for example by comparing the result to a predefined threshold).

Figure 5E:
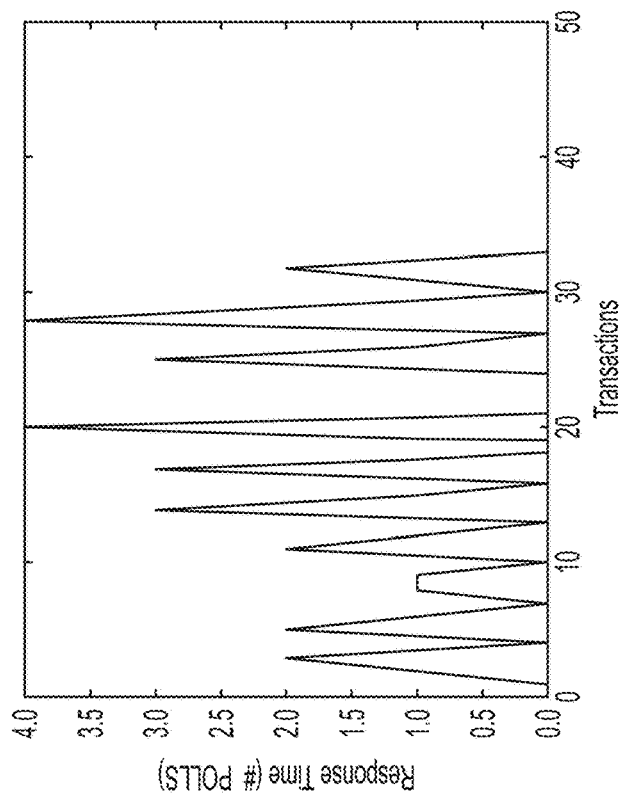
Figure 5D:
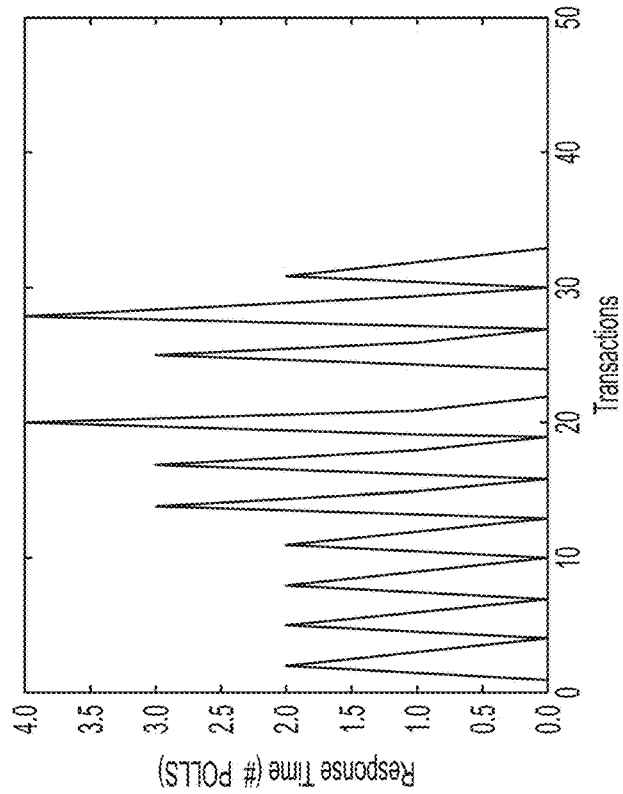

FIG. 5D illustrates the response of the USB flash drive 2 during a first measurement and may be used as a fingerprint for future transactions with USB flash drive 2. FIG. 5E illustrates the response of the USB flash drive 2 during a second measurement, for example when authentication is performed. As in the previous case, the timing characteristics of the responses of FIGS. 5B and 5C may be compared, for example using a correlation, to determine the degree to similarity.

Figure 5G:
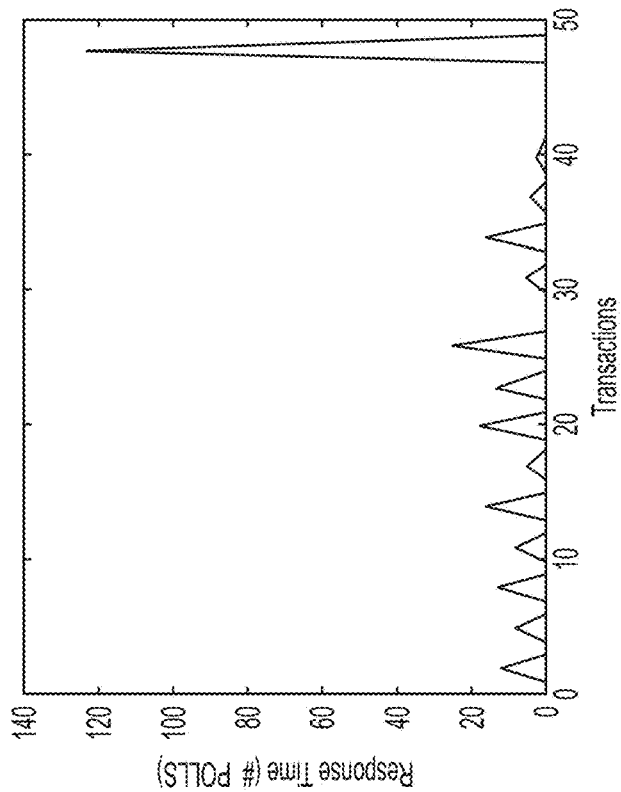
Figure 5F:
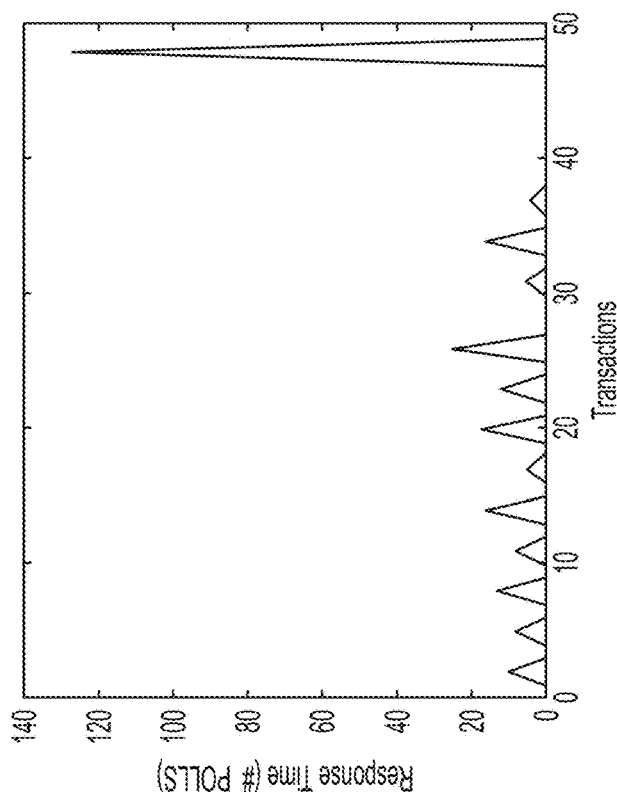

A third example is provided in FIGS. 5F-5G, in which two measurements are shown for USB flash drive 3. As in the previous cases, the timing characteristics of the response of FIG. 5G are compared to the timing characteristics of the response of FIG. 5F, and authorization is based on the result of the comparison. It should be appreciated that, in some embodiments, a fingerprint may be created using multiple responses such as the one illustrated in FIG. 5F. That is, multiple measurements (e.g., more than 10, more than 100, more than 1000, or more than 10000) may be aggregated using statistical, geometric and/or machine learning techniques for a specific USB device, and the aggregated data may be used as the fingerprint. In this way, the fingerprint is effectively averaged over multiple events of the same type, thus limiting the probability of creating a fingerprint based on data that deviates from the device's average response.

Figure 6C:
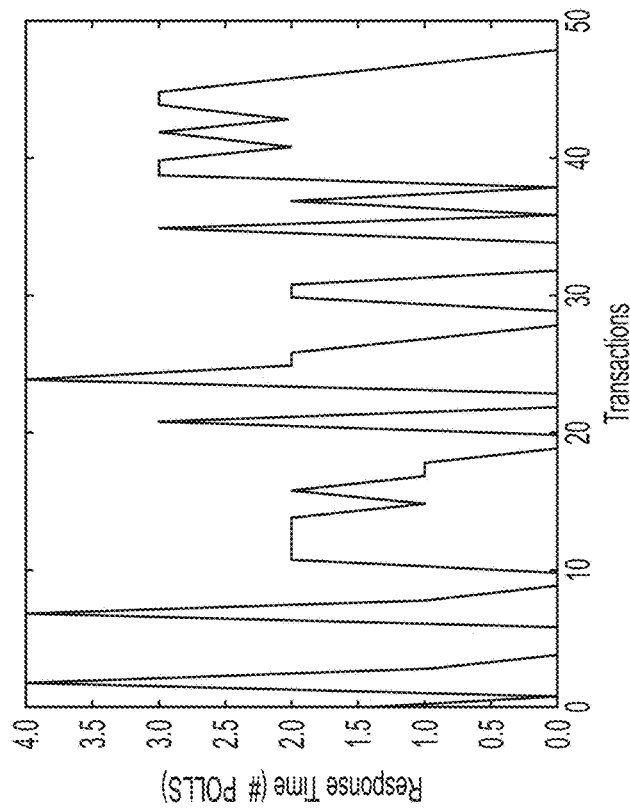
FIGS. 6B-6E are examples illustrating timing characteristics of responses provided by the keyboards of the table of FIG. 6A, in accordance with some embodiments.
Figure 6B:
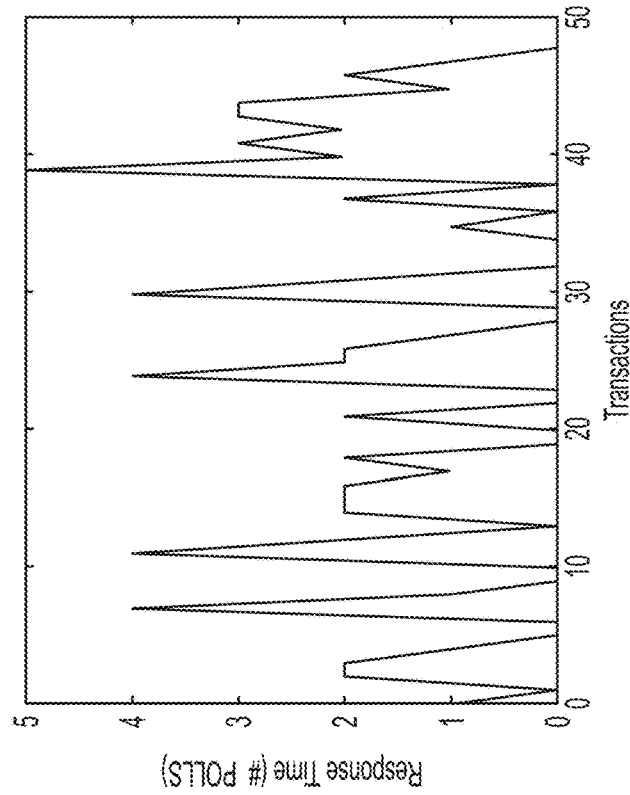
Figure 6E:
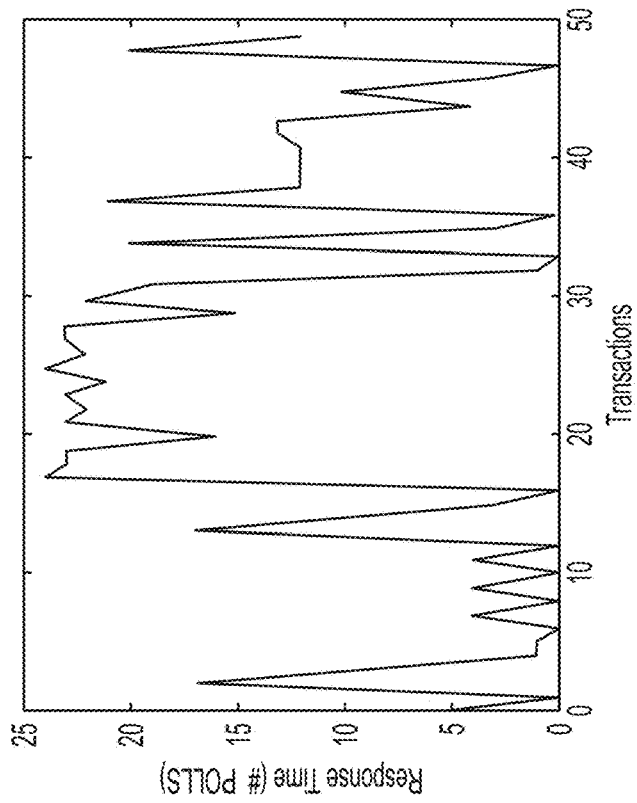
Figure 6D:
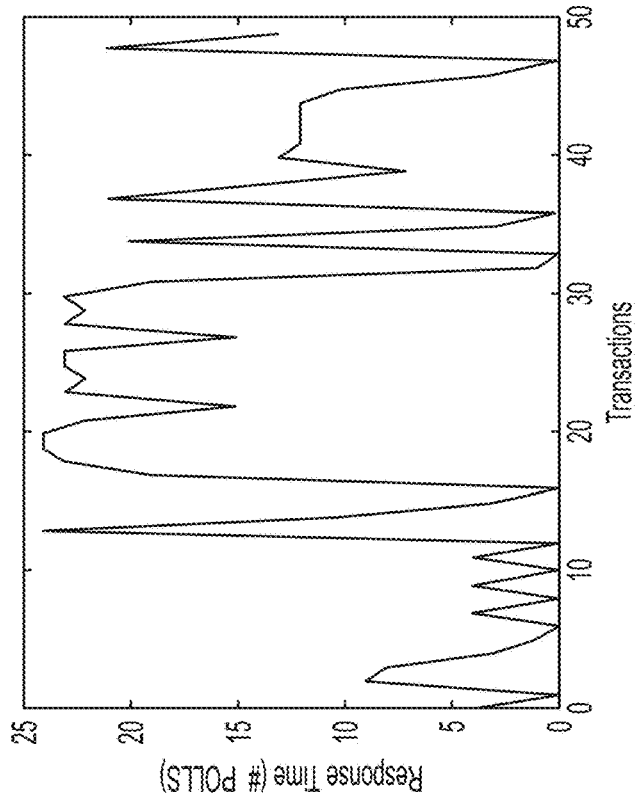

The table shown in FIG. 6A lists two keyboards that were characterized according to the behavioral authorization techniques described herein. FIG. 6B illustrates the response of the keyboard 1 during a first measurement and may be used as a fingerprint for future communication with keyboard 1. FIG. 6C illustrates the response of the keyboard 1 during a second measurement, for example when authentication is performed. Similarly, FIGS. 6D-6E illustrate another pair of measurements obtained using keyboard 2.

Figure 7B:
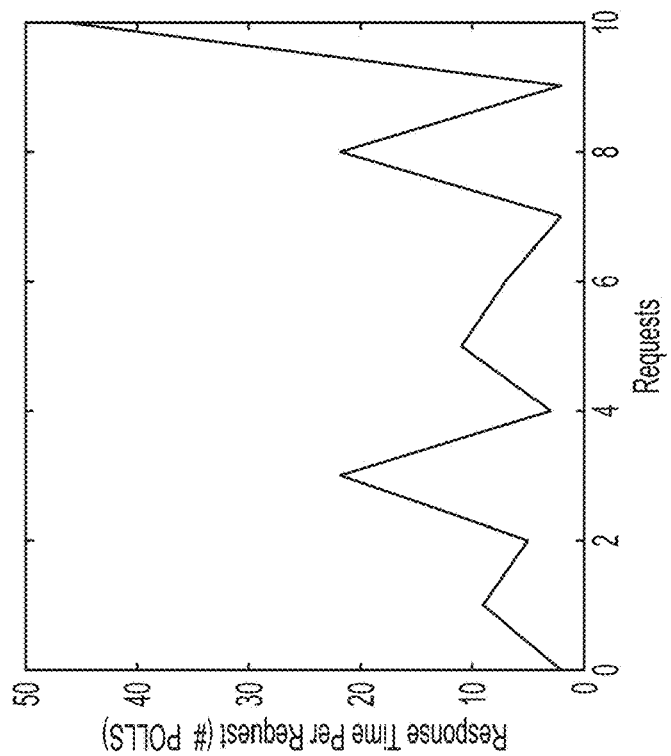
FIGS. 7A-7C are plots illustrating respectively number of polls per transaction, number of polls per request, and number of polls per type of request, in accordance with some embodiments.
Figure 7A:
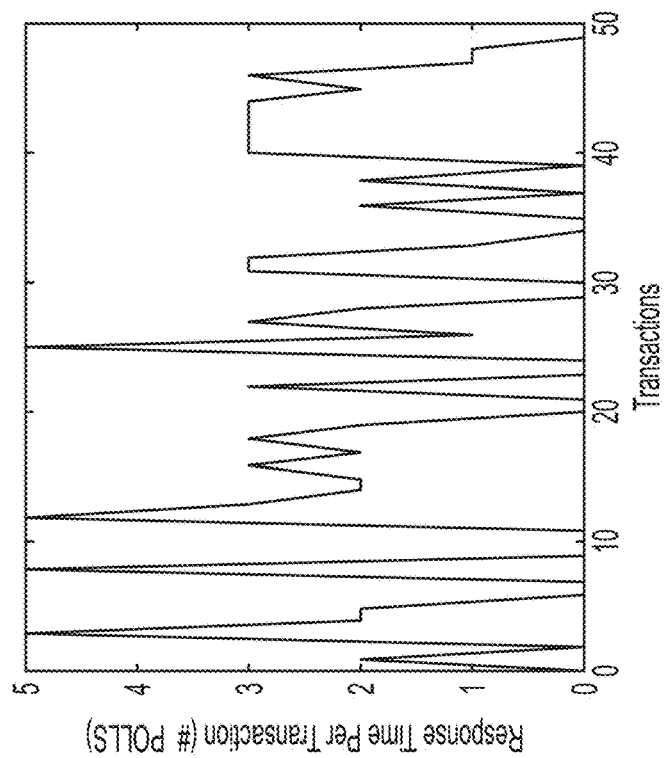
Figure 7C:
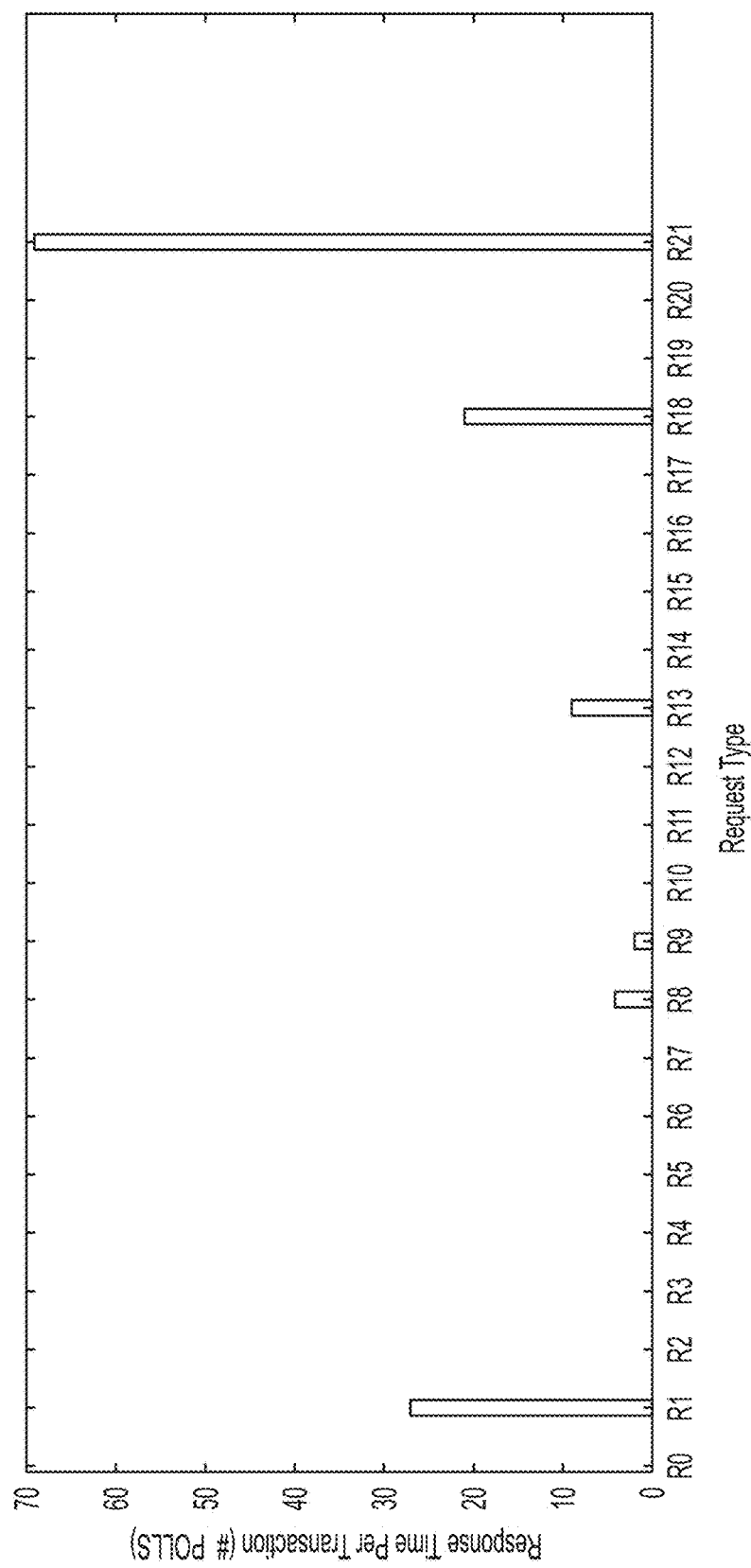

In some embodiments, the time characteristics of a request may be obtained by aggregating the time characteristics of several transactions, as each request may include multiple transactions. One exemplary type of request is get_descriptor, in which the USB device provides a descriptor data to the host device. Another type of request is set_address, in which an identification number is assigned to the USB device. In some embodiments, a behavioral fingerprint may be formed based on the time characteristics associated with different types of requests. FIGS. 7A-7C illustrate examples of aggregated data that may be used to form a behavioral fingerprint based on different types of requests, in accordance with some embodiments. Specifically, FIG. 7A illustrates the number of polls required to perform each transaction among a plurality of transactions. The transactions may represent transmission of packets, as described above. The transactions may be part of an enumeration process in some embodiments, though this illustrated technique may be used in connection with any other suitable type of process (e.g., following a reset signal, a mouse click, a keyboard stroke, a read operation, etc.). The transactions illustrated in FIG. 7A may collectively be part of a specific request, such as a set_address request or other types of requests. In some embodiments, the time characteristics of the transactions that constitute a request may be aggregated thereby providing a single time characteristic for the request. FIG. 7B illustrates the number of polls required to perform various requests. In this case, each the number of polls needed to complete a request is equal to the number of polls needed to perform all the transactions that constitute the request. In this way, the time characteristic of a specific request may be formed, and may be stored in the behavioral database for future authentication. In some embodiments, a behavioral fingerprint may be formed based on the time characteristics (e.g., number of polls) associated with different types of requests. FIG. 7C is a plot illustrating the number of polls required to complete different types of requests (R0, R1 . . . R21), in accordance with some embodiments. In this non-limiting examples, the R0, R1 . . . R21 labels are aliases for actual request types, including but not limited to set_address and get_descriptor. In this non-limiting example, requests of the type R1 take between 25 and 30 polls to complete and request of the type R21 take between 65 and 70 polls to complete. In some embodiments, the time characteristics for the requests may be stored in the behavioral database and may be indexed by request type, Accordingly, when a USB device is plugged in, behavioral authentication may be performed by determining whether a specific type of request has substantially the same time characteristic (e.g., the same number of polls with a 5% margin of error) as that stored in the data base.

In some embodiments, the polling rate may be very low (e.g., less than 25 KHz) such that the resulting time resolution is very low. Given the low polling rates, in at least some of these embodiments, the response of the USB device may include a single pulse (as shown, for example, in FIGS. 5B-5C). As a result, not much information may be obtained using timing characteristics. In some of these embodiments, it may first be determined whether the device is a low speed device (e.g., whether the polling rate is less than 25 KHz), and then other behavioral characteristics other than timing characteristics may be used for authentication.

IV. Discussion of Some Computer-Implemented Embodiments

Techniques operating according to the principles described herein may be implemented in any suitable manner. Included in the discussion above are a sequences of steps showing the steps and acts of various processes that enable behavioral authentication. The processing and decision blocks of the sequences above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the discussions of sequences of steps included herein do not depict the syntax or operation of any particular circuit or of any particular programming language or type of programming language. Rather, the discussions of sequences of steps illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application. Embodiments are not limited to being implemented in any specific number, division, or type of functional facilities. In some implementations, all functionality may be implemented in a single functional facility.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 806 of FIG. 8 described below (i.e., as a portion of a computing device 800) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Figure 8:
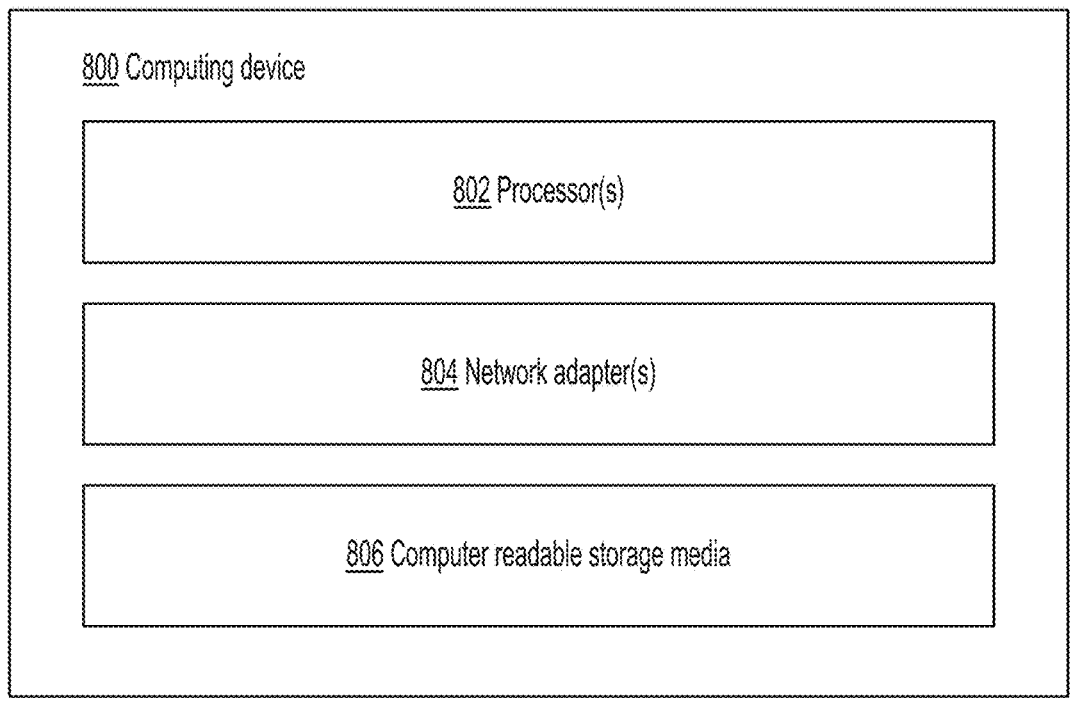
FIG. 8 is a block diagram illustrating an exemplary implementation of a computing device, in accordance with some embodiments.

In some, but not all, implementations in which the techniques may be embodied as computer-executable instructions, these instructions may be executed on one or more suitable computing device(s) operating in any suitable computer system, including the exemplary computer system of FIG. 8, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing devices (co-located or geographically distributed) dedicated to executing the techniques described herein, one or more Field-Programmable Gate Arrays (FPGAs) for carrying out the techniques described herein, or any other suitable system.

FIG. 8 illustrates one exemplary implementation of a computing device in the form of a computing device 800 that may be used in a system implementing techniques described herein, although others are possible. It should be appreciated that FIG. 8 is intended neither to be a depiction of necessary components for a computing device to operate as a remote computing device in accordance with the principles described herein, nor a comprehensive depiction.

Computing device 800 may comprise at least one processor 802, a network adapter 804, and computer-readable storage media 806. Computing device 800 may be, for example, a desktop or laptop personal computer, a personal digital assistant (PDA), a smart mobile phone, a server, a wireless access point or other networking element, or any other suitable computing device. Network adapter 804 may be any suitable hardware and/or software to enable the computing device 800 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 806 may be adapted to store data to be processed and/or instructions to be executed by processor 802. Processor 802 enables processing of data and execution of instructions. The data and instructions may be stored on the computer-readable storage media 806.

The data and instructions stored on computer-readable storage media 806 may comprise computer-executable instructions implementing techniques which operate according to the principles described herein. In the example of FIG. 8, computer-readable storage media 806 stores computer-executable instructions implementing various facilities and storing various information as described above. Computer-readable storage media 806 may store the inputs, the outputs and the lumped thermal characteristics described above, among other variables.

While not illustrated in FIG. 8, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated. Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method for authenticating a universal serial bus (USB) device, the method comprising:
receiving the USB device with a USB interface of a host device;
sensing a plurality of behavioral characteristics of the USB device;
comparing the plurality of behavioral characteristic of the USB device with data associated with the USB device, the data associated with the USB device being stored in a non-volatile memory of the host device, to obtain a value indicative of a degree of similarity between the plurality of behavioral characteristic of the USB device and the data associated with the USB device; and determining whether the USB device is an authorized device based on the value indicative of the degree of similarity between the plurality of behavioral characteristics of the USB device and the data associated with the USB device;

wherein sensing a plurality of behavioral characteristics of the USB device comprises sensing a plurality of timing characteristics of the USB device, and comparing the plurality of behavioral characteristics of the USB device with the data associated with the USB device comprises comparing the plurality of timing characteristics of the USB device with timing data associated with the USB device.

2. The method of claim 1, wherein sensing a plurality of timing characteristics comprises:

initiating an enumeration process between the host device and the USB device at least in part by sending a plurality of requests to the USB device for obtaining a plurality of device descriptor data;

receiving, from the USB device, a plurality of responses to the plurality of requests; and for at least a subset of the plurality of responses, sensing a plurality of timing characteristics associated with corresponding responses of the subset of the plurality of responses.

3. The method of claim 1, wherein the plurality of timing characteristics are selected among the group consisting of a reset duration, a timing of an enumeration sequence, a timing of a mass storage read operation, a timing of a mass storage write operation, a timing of a request operation, a timing of a mouse click operation, and a timing of a keyboard stroke operation.

4. The method of claim 1, further comprising providing an alert notification if it is determined that the USB device is not an authorized device based on the result of comparing the plurality of behavioral characteristics of the USB device with the data associated with the USB device.

5. The method of claim 1, further comprising:

receiving, from the USB device, one or more first device identifiers;

searching a database comprising a plurality of device identifiers for one or more second device identifiers matching with the one or more first device identifiers; and obtaining the data associated with the USB from the memory based on the one or more second device identifiers.

6. The method of claim 1, wherein:

comparing the plurality of behavioral characteristics of the USB device with the data associated with the USB device comprises performing a correlation between the plurality of behavioral characteristics of the USB device and the data associated with the USB device to obtain the value; and determining whether the USB device is an authorized device based on the value comprises determining whether the value is greater than a predefined threshold.

7. At least one non-transitory computer readable medium encoded with instructions that, when executed by at least one processor of a computer system, perform a method for authenticating a universal serial bus (USB) device, the method comprising:

upon reception of the USB device in a USB interface of a host computer, sensing a plurality of behavioral characteristics of the USB device;

comparing the plurality of behavioral characteristic of the USB device with data associated with the USB device, the data associated with the USB device being stored in a non-volatile memory of the host device to obtain a value indicative of a degree of similarity between the plurality of behavioral characteristic of the USB device and the data associated with the USB device; and determining whether the USB device is an authorized device based on the value indicative of the degree of similarity between the plurality of behavioral characteristic of the USB device and the data associated with the USB device;

wherein sensing a plurality of behavioral characteristic of the USB device comprises sensing a plurality of timing characteristics of the USB device, and comparing the plurality of behavioral characteristics of the USB device with the data associated with the USB device comprises comparing the plurality of timing characteristics of the USB device with timing data associated with the USB device.

8. The at least one non-transitory computer readable medium of claim 7, wherein sensing a plurality of timing characteristics comprises:

initiating an enumeration process between the host device and the USB device at least in part by sending one or more requests to the USB device for obtaining a plurality of device descriptor data;

receiving, from the USB device, a plurality of responses to the plurality of requests; and for at least a subset of the plurality of responses, sensing a plurality of timing characteristics associated to corresponding responses of the subset of the plurality of responses.

9. The at least one non-transitory computer readable medium of claim 7, further comprising:

receiving, from the USB device, one or more first device identifiers;

searching a database comprising a plurality of device identifiers for one or more second device identifiers matching with the one or more first device identifiers; and obtaining the data associated with the USB from the memory based on the one or more second device identifiers.

10. The at least one non-transitory computer readable medium of claim 7, wherein:

comparing the plurality of behavioral characteristics of the USB device with the data associated with the USB device comprises performing a correlation between the plurality of behavioral characteristics of the USB device and the data associated with the USB device to obtain the value; and determining whether the USB device is an authorized device based on the value comprises determining whether the value is greater than a predefined threshold.

11. A method for creating a fingerprint of a universal serial bus (USB) device, the method comprising:

receiving the USB device with a USB interface of a host device, wherein the USB device is deemed safe by a user;

initiating a transaction between the host device and the USB device at least in part by sending a plurality of requests to the USB device;

receiving, from the USB device, a plurality of responses to the plurality of requests;

for at least a subset of the plurality of responses, sensing a plurality of behavioral characteristics associated to corresponding responses of the subset of the plurality of responses; and storing the plurality of behavioral characteristics in a non-volatile memory of the host device;

wherein sensing a plurality of behavioral characteristics associated to corresponding responses of the subset of the plurality of responses comprises sensing a plurality of timing characteristics associated to corresponding responses of the subset of the plurality of responses and storing the plurality of behavioral characteristics in a non-volatile memory of the host device comprises storing the plurality of timing characteristics in a non-volatile memory of the host device.

12. The method of claim 11, further comprising training a machine learning system with the plurality of timing characteristics.

13. The method of claim 11, wherein initiating a transaction between the host device and the USB device at least in part by sending a plurality of requests to the USB device comprises initiating an enumeration process between the host device and the USB device at least in part by sending a plurality of requests to the USB device for obtaining a plurality of device descriptor data and wherein the plurality of responses to the plurality of requests represents the plurality of device descriptor data.

14. The method of claim 13, further comprising storing the plurality of device descriptor data, and indexing the plurality of behavioral characteristics stored in the non-volatile memory based on the plurality of device descriptor data.

15. A system for authenticating a universal serial bus (USB) device, the system comprising:
   a behavioral database comprising behavioral data associated to a plurality of USB devices;
   a fingerprint detector coupled to a USB interface of a host device, the fingerprint detector being configured to:
      sense, upon reception of a USB device with the USB interface, a plurality of behavioral characteristics of the USB device;
      compare the plurality of behavioral characteristic of the USB device with the behavioral data associated to a plurality of USB devices stored in the behavioral database to obtain a value indicative of a degree of similarity between the plurality of behavioral characteristic of the USB device and the behavioral data associated with at least one of the plurality USB devices; and
      determine whether the USB device is an authorized device based on the value indicative of the degree of similarity between the plurality of behavioral characteristic of the USB device and the data associated with at least one of the plurality USB devices;
   wherein the fingerprint detector is configured to sense the plurality of behavioral characteristics of the USB device at least in part by sensing a plurality of timing characteristics of the USB device, and wherein the fingerprint detector is configured to compare the plurality of behavioral characteristic of the USB device with the behavioral data associated to a plurality of USB devices at least in part by comparing the plurality of timing characteristic of the USB device with the behavioral data associated to the plurality of USB devices.

16. The system of claim 15, wherein the fingerprint detector is further configured to provide an alert notification if it is determined that the USB device is not an authorized device based on the result of comparing the plurality of behavioral characteristics of the USB device with the data associated with at least one of the plurality USB devices.

17. The system of claim 15, further comprising a descriptor database comprising first descriptor data for the plurality of USB devices, and wherein the fingerprint detector is further configure to:
   receive, second descriptor data associated with the USB device;
   search the descriptor database for first descriptor data matching with the second descriptor data; and
   obtain the data associated with at least one of the plurality of USB devices based on the second descriptor data.

18. The system of claim 15, wherein the fingerprint detector is configured to:
   sense the plurality of behavioral characteristics of the USB device at least in part by sensing a number of polls required to complete a plurality of transactions;
   compare the plurality of behavioral characteristic of the USB device with the behavioral data associated to the plurality of USB devices at least in part by comparing the number of polls required to complete the plurality of transactions with the behavioral data associated to the plurality of USB devices; and
   determine whether the USB device is an authorized device based on the value indicative of the degree of similarity between the number of polls required to complete a plurality of transactions and the data associated with the at least one of the plurality USB devices.

* * * * *